(12) United States Patent
Trevathan et al.

(10) Patent No.: US 9,900,756 B2
(45) Date of Patent: Feb. 20, 2018

(54) DYNAMICALLY UPDATING POLICY CONTROLS FOR MOBILE DEVICES AND APPLICATIONS VIA POLICY NOTIFICATIONS

(71) Applicant: Kony Inc., Orlando, FL (US)

(72) Inventors: Matthew B. Trevathan, Roswell, GA (US); Keith Katz, Orlando, FL (US)

(73) Assignee: KONY, INC., Orlando, FL (US)

( * ) Notice: Subject to any disclaimer, the term of this patent is extended or adjusted under 35 U.S.C. 154(b) by 0 days.

(21) Appl. No.: 15/137,531

(22) Filed: Apr. 25, 2016

(65) Prior Publication Data

US 2016/0316348 A1   Oct. 27, 2016

Related U.S. Application Data

(60) Provisional application No. 62/152,292, filed on Apr. 24, 2015.

(51) Int. Cl.
| | |
|---|---|
| *H04M 3/00* | (2006.01) |
| *H04W 4/14* | (2009.01) |
| *H04W 4/00* | (2018.01) |
| *H04W 68/00* | (2009.01) |

(52) U.S. Cl.
CPC ............ *H04W 4/14* (2013.01); *H04W 4/003* (2013.01); *H04W 68/005* (2013.01)

(58) Field of Classification Search
CPC ...... H04W 4/12; H04W 4/02; H04L 12/5895; H04L 29/08657; H04M 3/533
USPC ........ 455/410–415, 418–420, 423, 444–445, 455/452.2, 466
See application file for complete search history.

(56) References Cited

U.S. PATENT DOCUMENTS

| | | | | |
|---|---|---|---|---|
| 7,391,719 B2* | 6/2008 | Ellis | ..................... | H04L 49/351 370/219 |
| 2008/0293390 A1* | 11/2008 | Yang | ..................... | H04M 3/02 455/414.1 |
| 2012/0135719 A1* | 5/2012 | Haughn | ..................... | G06F 8/65 455/414.1 |
| 2014/0024368 A1* | 1/2014 | Jin | ..................... | H04W 8/02 455/433 |
| 2014/0038595 A1* | 2/2014 | Kurokawa | ............ | H04L 63/162 455/433 |
| 2014/0087771 A1* | 3/2014 | Ryu | ..................... | H04W 68/00 455/458 |
| 2014/0089485 A1* | 3/2014 | Boberg | ................. | H04W 8/245 709/223 |
| 2014/0120917 A1* | 5/2014 | Yoshihara | ......... | H04W 36/0033 455/436 |

(Continued)

*Primary Examiner* — Dai A Phuong
(74) *Attorney, Agent, or Firm* — Andrew M. Calderon; Roberts Mlotkowski Safran Cole & Calderon, P.C.

(57) ABSTRACT

A computer-implemented method, comprises: providing, by a computing device, a policy notification to selected one or more user devices via a primary communications channel to cause the selected one or more user devices to update a policy when the policy notification is received by the user device; and providing, by the computing device, an alternate policy to the selected one or more user devices via an alternate communications channel when the selected one or more user devices does not receive the policy notification via the primary communications channel, wherein providing the alternate policy notification causes the selected one or more user devices to update the policy.

19 Claims, 8 Drawing Sheets

(56) References Cited

U.S. PATENT DOCUMENTS

| | | | | |
|---|---|---|---|---|
| 2015/0188991 A1* | 7/2015 | Huang | ............... | H04L 67/2861 709/217 |
| 2015/0189631 A1* | 7/2015 | He | ......................... | H04W 4/08 455/418 |
| 2017/0238142 A1* | 8/2017 | Hornor | ................ | H04W 4/028 455/456.1 |

* cited by examiner

DYNAMICALLY UPDATING POLICY CONTROLS FOR MOBILE DEVICES AND APPLICATIONS VIA POLICY NOTIFICATIONS

FIELD OF THE INVENTION

The invention relates to control of mobile and device applications and, more particularly, to systems and processes for dynamically implementing policy updates for controlling mobile devices and applications via policy notifications.

BACKGROUND OF THE INVENTION

Mobile Device Management (MDM) is a system in which functions of a registered user device (e.g., a smart phone, a tablet, etc.) can be remotely controlled, e.g., by an administrator server. For example, the administrator server may control or block functions of the user device such as screen capture functions, microphone usage, camera usage, usage of certain communications hardware (e.g., Bluetooth, NFC, WiFi, etc.), access to device services (e.g., messaging), etc.

MDM techniques are sometimes used in Enterprise Mobility Management (EMM). In such application, an administrator may use an MDM system to control the allowed functions of the user device so that usage of the user device complies with certain security and/or company policies. For example, an enterprise or company may have a policy that screen shots of sensitive information presented within a particular application should not be taken. To adhere to this policy, an administrator may implement an MDM policy to prevent the user device from taking screen shots. As a cost-savings alternative to providing employees with company issued user devices, a business may allow their employees to use the employee's personal user devices for both personal and business functions. In order to ensure compliance with security policies, MDM techniques can be implemented on a personal user device.

MDM is limited in that entire functions of the user device need to be blocked, regardless of what the other users of the user device. For example, in the preceding example, the user will be unable to take screen shots entirely, even if the user is not accessing sensitive information.

Application-specific control policies can be implemented in which a small select subset of functions (e.g., camera use, copy/paste use) are disabled based on the application in the foreground of the user device. For example, application developers can add contextual capabilities to their application by directly programming these into the application, effectively hard coding the policy into the application itself. For instance, if a developer would like to control access to specific forms in an application given the location of the individual using the application, the developer could build in hardcode logic into the application to determine the user's location and deny access based on the user location. In these situations, issues arise implementing policy changes for the application. For example, since policies are hardcoded into the application, changing the policies for the application (e.g., to allow a specific subset of users to be granted new permissions when using the application) requires a lengthy redeployment and republishing of the application. Further, changing the policies would require the user to update the application in order to effectuate the changes. Additionally, access to specific changes would require the user to fully restart the application in order for those changes to take effect therefore preventing a policy for being pushed to the application while in use. Also, the list of features that can be hard coded to be controlled is a small subset of the device level controls available through MDM policy.

SUMMARY OF THE INVENTION

In an aspect of the invention, a computer-implemented method, comprises: providing, by a computing device, a policy notification to selected one or more user devices via a primary communications channel to cause the selected one or more user devices to update a policy when the policy notification is received by the user device; and providing, by the computing device, an alternate policy to the selected one or more user devices via an alternate communications channel when the selected one or more user devices does not receive the policy notification via the primary communications channel, wherein providing the alternate policy notification causes the selected one or more user devices to update the policy.

In an aspect of the invention, there is a computer program product comprising a computer readable medium having program instructions embodied therewith. The computer readable medium is not a transitory signal per se, and the program instructions are readable by a server device to cause the server device to perform a method comprising: receiving an update to a policy for a user device; determining that the user device is unable to communicate via a primary communications channel; and providing an alternate policy notification to a user device via an alternate communications channel based on the determining, wherein providing the alternate policy notification causes the user device to update the policy.

In an aspect of the invention, a system includes: a CPU, a computer readable memory and a computer readable medium; program instructions to program instructions to receive a policy notification from a policy server; program instructions to request an updated policy from the policy server based on receiving the policy notification; program instructions to receive the updated policy from the policy server; and program instructions to implement the updated policy The program instructions are stored on the computer readable medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
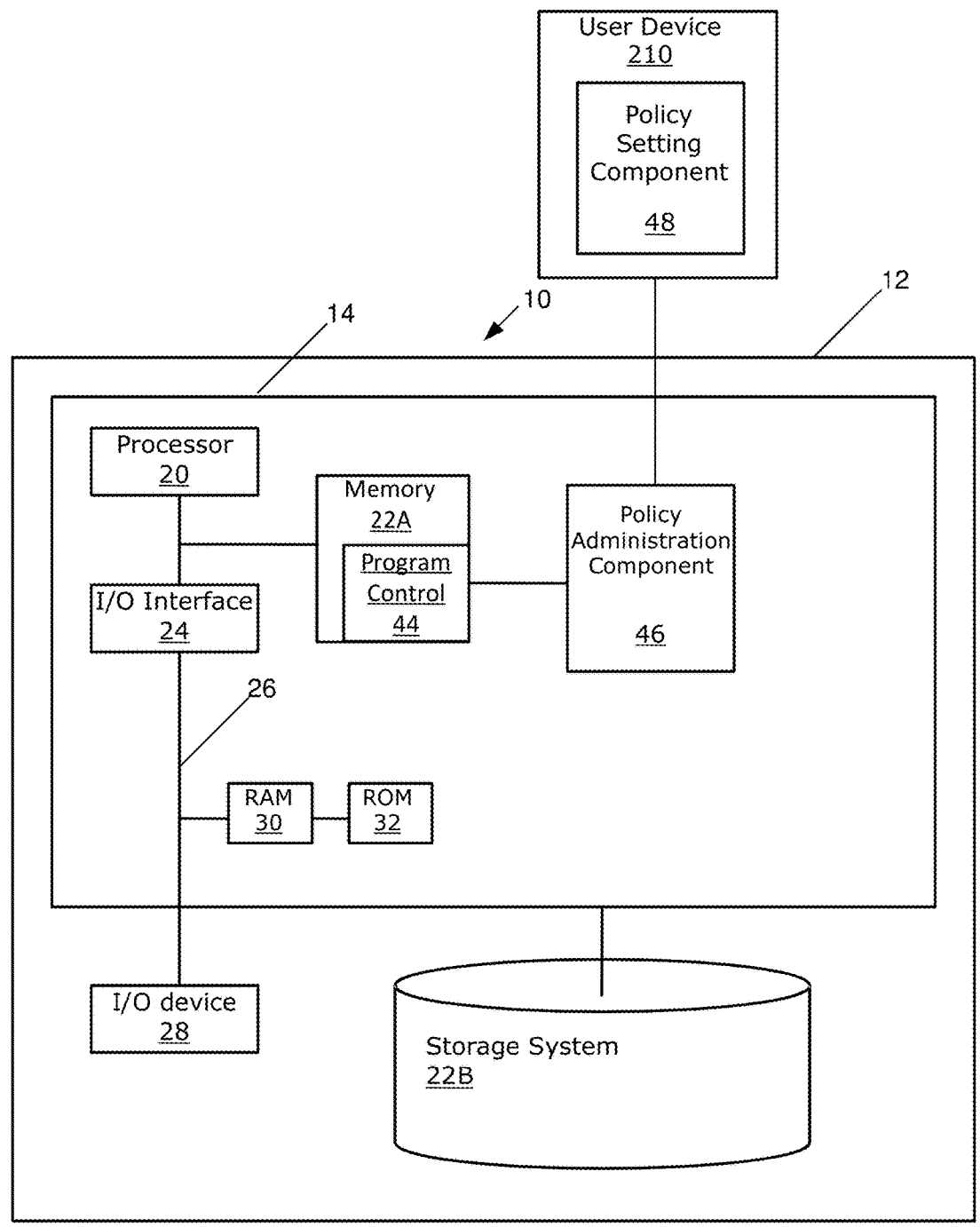
FIG. 1 shows an illustrative environment for managing the processes in accordance with the present disclosure.

The invention relates to control of mobile and device applications and, more particularly, to systems and processes for dynamically implementing policy updates for controlling mobile devices and applications via policy notifications. In more specific embodiments, the systems and processes described herein may dynamically update user device control and/or application policies based on a user device receiving a policy notification from a policy server. Advantageously, the systems and processes described herein can provide updated policies to any selected user devices which can be implemented without the need for lengthy and costly redeployment and republishing of the application. Moreover, the systems and processes described herein can provide the updated policies to any combination of user devices without having to provide updates to each and every user device which is implementing a same application, as an example. In this way, the systems and processes described herein can provide policy updates in a very granular fashion.

As described herein, the policy server may receive a policy update from an administrator. Based on receiving the policy update, the policy server may push a policy notification to a user device for which the updated policy is to be implemented. In embodiments, the policy notification may include information regarding policy itself and information that the user device may use to implement the policy. For example, the policy notification may include a text message having the policy information in a particular format interpretable by the user device as a policy update.

More specifically, in embodiments, the information contained would be new directional information for policy settings. Each policy is a static entity of defined items. For example, an iOS restrictions policy contains a specific set of roughly 100 controls defined by Apple® and/or developer of a mobile device operating system. The policy information sent would be changes of state to controls within a specific policy item. The device knows what to do with this information because the operating system itself has the policy framework built in. This framework is made available for communication and changes to an MDM server by the act of the device being enrolled against said MDM server. So, if a device is enrolled against an MDM server, and a message is received with the correctly formatted information for the framework utility, it will accept it and make changes accordingly.

Alternatively, the policy notification may indicate that an updated policy is available from the policy server. Based on receiving the policy notification, the user device may obtain the updated policy from the policy server, and implement the policy.

As described herein, the user device may not display the policy notification to the user, but may instead use the notification to update the policy without user involvement. In this way, the user device may implement the most up-to-date policies without user involvement and without the need to redeploy or update applications on the user device. While the user device may not need to display the policy notification, in embodiments, the user device can display the policy notification to alert the user that an updated policy is available and will be implemented.

In embodiments, the policy notification may be provided through a primary communications channel, such as through an internet protocol (IP) network. In embodiments, the policy notification may be an IP based notification, e.g., an IP text message, a push notification, a computer file, and/or other IP-based message. As described herein, the policy server may push an IP based policy notification to the user device via a messaging server through the primary communications channel, e.g., an external IP network. The messaging server may identify a messaging network via which to provide the policy notification, and may indicate to the policy server whether the push notification has been received by the use device, as should understood by those of skill in the art. If the policy server does not receive a confirmation that the policy notification has been received, the policy server may provide an alternate policy notification (e.g., a non-IP based message) to the user device via an alternate communications channel (e.g., a non-IP network such as SMS). Thus, if the primary notification network does not receive confirmation, the server assumes it was not received and switches over to sending the info via a different channel, such as SMS. Accordingly, that is, the policy server may provide the alternate policy notification to the user device via an alternate communications channel in the event that the user device does not receive the policy notification through the primary communications channel, e.g., when the user device is offline from an external IP network at the time that an policy notification is sent. This may occur, for example, when Mobile Data and WiFi are disabled on the user device or when the user device is otherwise offline.

As described herein, the alternate policy notification may include a short message service (SMS) message, a missed call notification, and/or other type of notification that can be provided to the user device via the alternate communications channel. In an implementation in which the alternate policy notification includes a missed call notification, the user device may interpret a telephone number of the missed call notification as an indication that an updated policy is available on the policy server. Based on this interpretation, the user device may request the updated policy from the policy server.

In embodiments, the policy server may only provide policy notifications (e.g., non-IP based notification) through the alternate channel without attempting to provide IP based policy notifications via the primary channel. Alternatively, the policy server may provide policy notifications via both the primary and alternate communications channels whether or not a confirmation is received from the messaging server that an IP based policy notification has been received by the user device. In embodiments, the policy server may provide policy notifications via the alternate communications channel to a user device when mobile data and/or WiFi functions have been disabled on the user device (e.g., by an administrator).

In a scenario in which the user device is able to communicate via the alternate communications channel but not the primary communications channel, the user device may receive the policy notification via the alternate communications channel in order to implement an updated policy. In a scenario in which the user device is powered off or is otherwise unable to communicate via either the primary or alternate communications channels, the user device may receive a policy notification, e.g., via either the primary or alternate communications channel, once the user device later re-establishes communication with the primary or alternate communications channels. In this way, the user device may later receive and implement an updated policy even if a policy notification is pushed to the user device at a time when the user device is offline. As described herein, updated policies may be applied to disable one or more of: WiFi functions; Bluetooth functions; NFC functions; copy/paste functions; telephone calling functions; messaging functions; access to forms; access to content, applications, or sub-applications; and/or any other functions on a user device as defined by an administrator.

In embodiments, the user device may receive an updated policy from the policy server, e.g., an EMM server, a Mobile Backend as a Service (MBaaS) server, or the like, based on receiving a notification of a policy change. Accordingly, the user device may set and implement the most current or up-to-date policies without requiring redevelopment and/or redeployment of the application. In this way, a user device can be dynamically controlled based on the user's usage of the user device, and more specifically, the most up-to-date device and application control policies can be implemented. For example, updating a policy would only require an update to the policy information stored in the policy server, but would not require re-writing of the application code itself.

In embodiments, the user device may resolve the user's state once a new policy has been applied. Resolving the user state may include moving a user back to permitted content within an application (e.g., similar to using a back button in a browser) until the user is in a permitted location within the application. Resolving the user state may also include restarting the application to ensure that the user is not in violation of an updated policy, e.g., by restoring the user's state to a home screen of the application or a screen having known permitted content. In embodiments, the user device may detect if the user is in a non-permitted section of the application and may apply the user's role in accordance with an updated policy. Accordingly, updated policies may be applied such that the user may not be aware that the updated policies are in effect in a scenario in which the updated policies do not directly affect the user's usage of the application in its current state.

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in computer readable storage medium.

The computer readable storage medium is not a transitory signal per se, and is any tangible medium that can contain and store the program for use by or in connection with an instruction execution system, apparatus, or device. For example, the computer readable storage medium can comprise electronic, magnetic, optical, electromagnetic, infrared, and/or semiconductor systems and/or devices. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

FIG. 1 shows an illustrative environment 10 for managing the processes in accordance with the invention. The environment 10 includes a server 12 or other computing system. The server 12 can be a standalone server, which implements the processes described herein within a networking environment. The server 12 and/or processes performed by the server 12 can be integrated into the networking environment (e.g., cloud environment) such as shown in FIG. 2 or any enterprise management system as described herein.

In specific embodiments, the server 12 can be representative of a mobile backend as a service (MBaaS), maintained by a service provider, e.g., Kony™. As should be understood by those of ordinary skill in the art, the MbaaS is a model for providing web and mobile application developers with a way to link their applications to backend cloud storage and APIs exposed by backend applications, while providing features such as user management, push notifications, and integration.

In embodiments, the server 12 can also be representative of other types of business enterprise servers, accessible via cloud based applications. For example, the server 12 can be a single, open standards-based mobile infrastructure platform. In embodiments, the single, open standards-based mobile infrastructure platform can unify multiple infrastructures/platforms together, including mobile application development platform (MADP), mobile backend as a service (MBaaS), Application Programming Interface (API) management, and platform as-a-service (PaaS) infrastructures. To this end, for example, the server 12 can be representative of Kony™ MobileFabric™ which is a converged mobile infrastructure that empowers enterprises to significantly reduce time to market. In this example, the server 12 can further integrate EMM/MAM server functions (e.g., management instances), as well as incorporate any number of enterprise stores, e.g., app store. For example, the server 12 can recognize any EMM provider with an API catalog, with publishing capabilities from an MBaaS.

In embodiments, the computing system 12 is accessible by users of user device(s) 210. As used herein, a user device 210 refers to a smartphone, tablet computer, personal digital assistant, or similar computing device that includes a mobile operating system, wireless communication antenna, processor, user interface, memory, etc.

In embodiments, the computing system 12 can be a standalone server, which implements the processes of the present invention within a networking environment. The computing system 12 and/or processes performed by the computing system 12 can be integrated into the networking environment of any enterprise. The computing system 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14.

In addition, the computing device 14 includes a random access memory (RAM), a read-only memory (ROM), and an operating system (0/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., user device 210, etc.) using any type of communications link.

The processor 20 executes computer program code (e.g., program control 44), which can be stored in the memory 22A and/or storage system 22B. In embodiments, the program control 44 of the computing device 14 of the computing system 12 controls a policy administration component 46, which comprises program code that is adapted to perform one or more of the processes described herein. The policy administration component 46 can be implemented as one or more program code in the program control 44 stored in memory 22A as separate or combined modules. Additionally, the policy administration component 46 may be implemented as separate dedicated processors or a single or several processors to provide the functions described herein. While executing the computer program code, the processor 20 can read and/or write data to/from memory 22A, storage system 22B, and/or I/O interface 24. In this manner, the program code executes the processes of the invention.

The program code can include computer program instructions that are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable medium.

According to aspects of the invention, the policy administration component 46 may store policies associated with any number and combination of user devices 210. For example, the policy administration component 46 may store policies that permit or prevent certain functions to be performed on any number and combination of the user device 210 based on user information (e.g., user login credential, user device hardware identifiers, etc.) or other criteria as set forth by an administrator. In more specific embodiments, the policy administration component 46 may push a policy notification to the user device 210 via a primary communications channel and a messaging server. Further, the policy administration component 46 may push a policy notification via an alternate communications channel in the event the policy notification is not received by the user device 210 via the primary communications channel. In embodiments, the policy administration component 46 may receive a request for an updated policy from the user device 210, and may provide the updated policy to the user device 210. The policy can be any policy particular to any user device 210 based on any number of criteria such that updates can be provided in a very granular manner to any combination of user devices 210. In this way, the systems and processes described herein can provide updated policies to any selected user devices 210 which can be implemented without the need for lengthy and costly redeployment and republishing of the application. Moreover, the updated policies can be provided to any combination of user devices without having to provide updates to each and every user device which may be implementing a same application. In this way, the policy administration component 46 provides policy updates in a very granular fashion to different devices 210 based on different criteria, which may be set by a policy administrator.

In embodiments, the user device 210 may include a policy setting component 48 which may include an application wrapper that intercepts a policy notification from the server 12. The policy setting component 48 may implement the updated policies identified within the policy notification. Alternatively, the policy setting component 48 may request updated policies from the policy administration component 46. Further the policy setting component 48 may implement the policies (e.g., by preventing or allowing the user device 210 from executing functions).

Figure 2A:
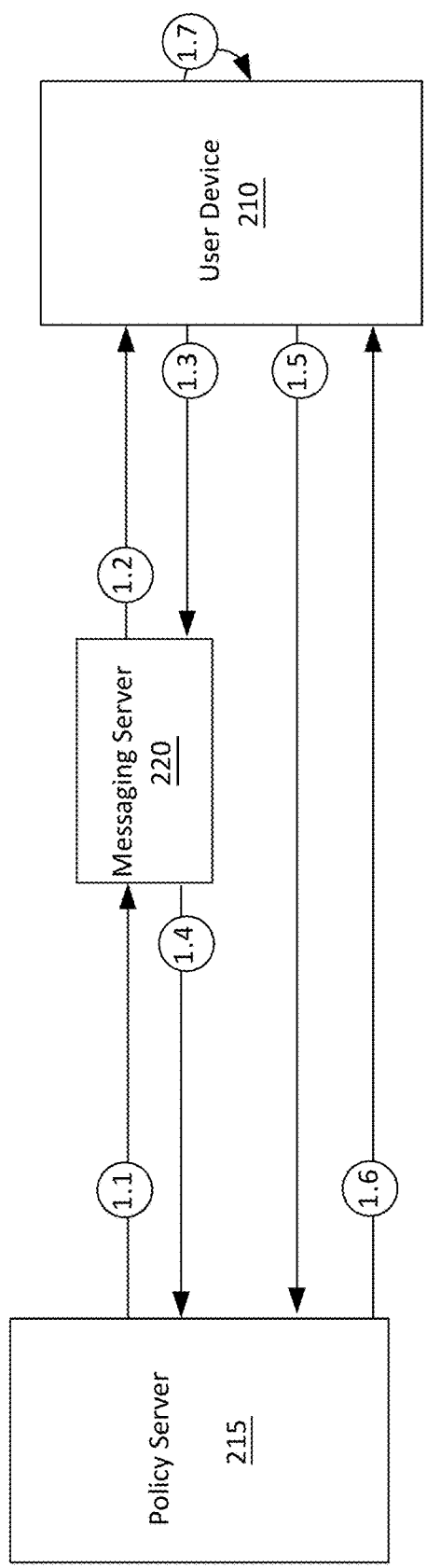
FIGS. 2A and 2B show an overview of an example environment in which aspects of the present disclosure may be implemented.
Figure 2B:
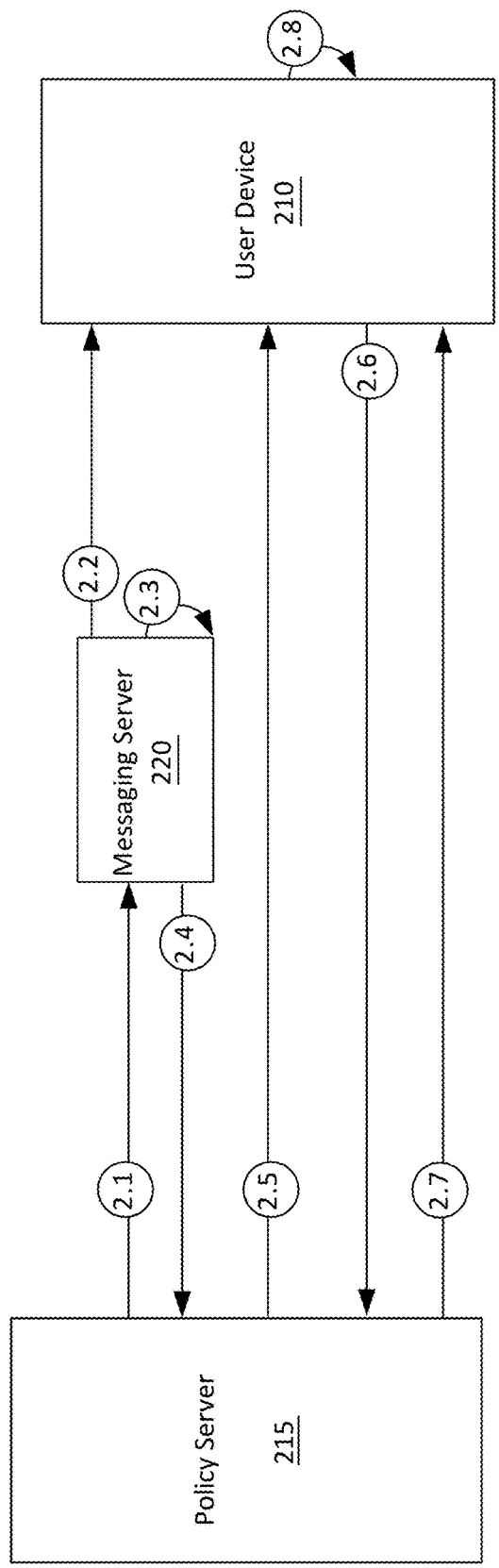

FIGS. 2A and 2B show an overview of an example environment in which aspects of the present invention may be implemented. As shown in FIG. 2A, environment 200 may include the user device 210, a policy server 215, and a message server 220. In embodiments, the policy server 215 can be representative of the server 12 of FIG. 1. Additionally, or alternatively, the user device 210 and/or the messaging server 220 may include one or more of the components of server 12 of FIG. 1.

As described herein, the user device 210 may include a smartphone, tablet computer, personal digital assistant (PDA), or other computing device that includes a mobile operating system, wireless communication antenna, processor, user interface, memory, etc. The user device 210 may receive a policy notification from the policy server 215 and may implement the policy based on the policy notification. For example, the policy server 215 may request an updated policy from the policy server 215 or may implement a policy based on information included in the policy notification (e.g., without requesting an updated policy from the policy server 215). The user device 210 may include the policy setting component 48 of FIG. 1.

The policy server 215 may include one or more computing/server devices that stores policies and provides policy notifications for updated policies to the user device 210. The policy server 215 may include one or more components of the computing system 12 and may include the policy administration component 46 of FIG. 1.

The messaging server 220 may include one or more computing/server devices that provides IP based notifications/messages to the user device 210 from the policy server 215. As should be understood by those of ordinary skill in the art, the messaging server 220 may output IP based notifications/messages via different networks based on the type or brand of messaging application used by user device 210. The application server 220 may include one or more components of the computing system 12 of FIG. 1.

The quantity of devices in the environment 200 is not limited to what is shown in FIG. 2A. In practice, the environment 200 may include additional devices and/or networks; fewer devices and/or networks; different devices and/or networks; or differently arranged devices and/or networks than illustrated in FIG. 2A. Also, in some implementations, one or more of the devices 210 of the environment 200 may perform one or more functions described as being performed by another one or more of the devices of the environment 200. Devices of the environment 200 may interconnect via wired connections, wireless connections, or a combination of wired and wireless connections.

Referring still to FIG. 2A, in operation, a policy server 215 may provide, at step 1.1, a policy notification to the user device 210 via primary communications channel. For example, the policy notification may include an indication that an updated policy is available on the policy server 215. At step 1.2, a messaging server 220 may provide the policy notification to the user device 210. For example, as is understood by those of skill in the art, the messaging server 220 may provide the policy notification via a particular messaging network using a particular known messaging protocol based on the messaging application used by the user device 210 (which may be based on a brand and/or operating system of the user device 210). At step 1.3, the user device 210 may provide a confirmation to the messaging server 220 that the policy notification has been received, and at step 1.4, the messaging server 220 may provide confirmation to the policy server 215. At step 1.5, the user device 210 may request the policy update from the policy server 215, and at step 1.6, the policy server 215 may provide the policy update. At step 1.7, the user device 210 may implement the policy update and may resolve the user's state within an application associated with the policy.

Referring to FIG. 2B, the policy server 215 may provide, at step 2.1, a policy notification to the user device 210 through use of the primary communications channel, and at step 2.2, the messaging server 220 may provide the policy notification to the user device 210. In FIG. 2B, assuming that the user device 210 is offline or is otherwise unable to receive the policy notification via the primary communications channel, the user device 210 would not provide a confirmation that the policy notification has been received. At step 2.3, the messaging server 220 determines that the policy notification has not been received, e.g., after multiple attempts have been made to provide the policy notification and/or after a threshold period of time has passed without receiving the conformation from the user device 210. At step 2.4, the messaging server 220 provides an indication to the policy server 215 that the policy notification was not received by the user device 210.

At step 2.5, the policy server 215 may provide a policy notification via an alternate communications channel (e.g., in the form of a missed call notification and/or an SMS message). At step 2.6, upon receipt of the policy notification, the user device 210 may request a policy update from the policy server 215, and at step 2.7 the policy server 215 may provide the policy update. At step 2.8, the user device 210 may implement the policies and resolve the user's state, as described herein. If, for example, the user device 210 is unable to communicate with the policy server 215, e.g., if mobile data and/or WiFi have been disabled by an administrator, the user device 210 may be permitted to temporarily communicate with policy server 215 in order to obtain the policy updates. If, for example, the user device 210 is unable to communicate with the policy server 215 if user device 210 is temporarily offline, the user device 210 may obtain the policies from the policy server 215 when the user device 210 later goes online.

In embodiments, certain steps of FIG. 2B may be omitted (e.g., steps 2.1-2.4). For example, the policy server 215 may provide a policy notification via an alternate communications channel without attempting to send the policy notification via the primary communications channel and without involving the messaging server 220. In embodiments, the policy server 215 may provide a policy notification via the alternate communications channel when it is known that user device 210 may not receive the policy notification via the primary communications channel (e.g., when mobile data and WiFi functions on user device 210 are disabled by an administrator).

Figure 3:
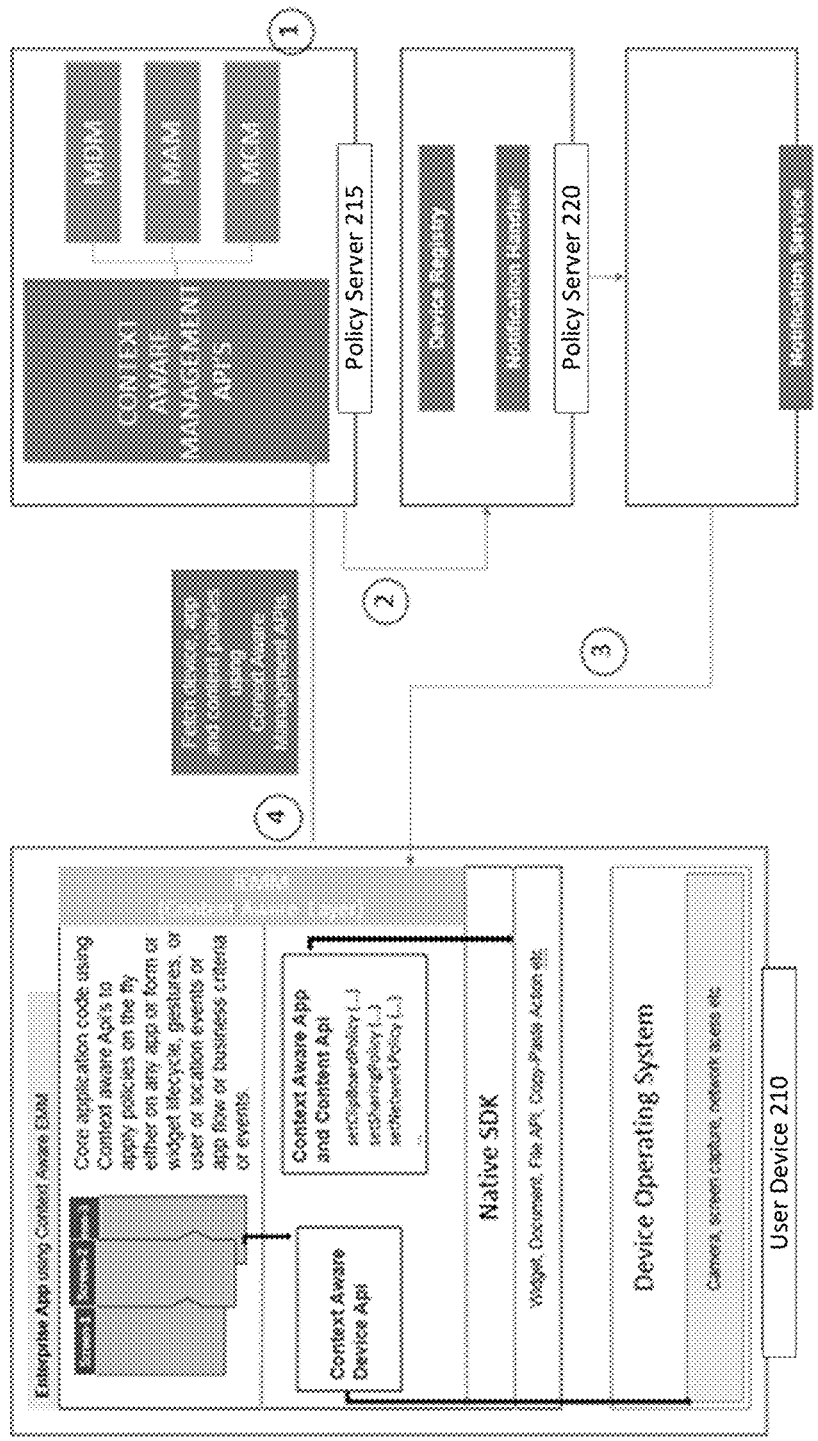
FIG. 3 shows an illustrative system for managing the processes in accordance with the present disclosure.

FIG. 3 shows an illustrative system for managing the processes in accordance with the invention. In embodiments, the systems and processes described herein leverage messaging services (e.g., within Kony's™ mobile fabric targeted devices) as should be known by those of ordinary skill in the art. Kony's™ messaging services can target a user's user device 210 to a specific notification service based on the device type. At first step 1, an administrator creates a policy within the policy server 215. The administrator may update a policy for a specific user device 210 or group of user devices 210 identified by the device type itself, the user, the user group or the like. Once the policy has been set, the policy server 215, at step 2, provides a request (e.g., a policy notification) to the messaging server 220 to inform each device that the new policy is associated with to update their policy. The messaging server 220 includes a user registry of user devices 210 and determines via which notification service to provide the policy notification based on the device registry. Each user device 210 receives the policy notification, at step 3, from its corresponding notification service to update its policy. At step 4, an application wrapper of the user device 210 requests the new policy from the policy server 215 and applies the policy to the application.

Figure 4:
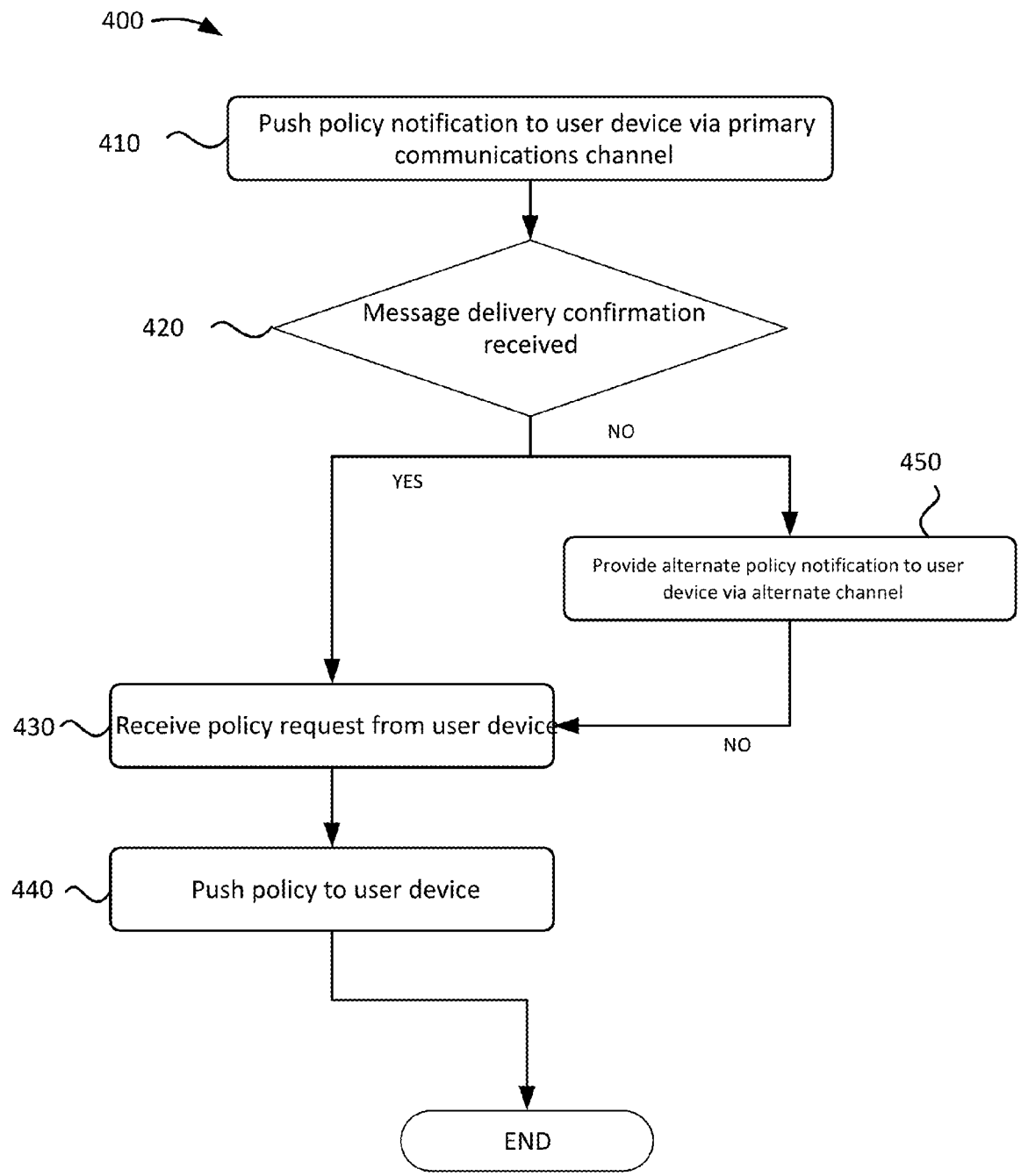
FIG. 4 shows an example flowchart for dynamically implementing updated policies via policy notifications in accordance with aspects of the present disclosure.

FIG. 4 shows an example flowchart for dynamically implementing updated policies via policy notifications in accordance with aspects of the present disclosure. The steps of FIG. 4 may be implemented in the environment of FIGS. 1, 2A, and/or 2B, for example, and are described using reference numbers of elements depicted in FIGS. 1, 2A, and/or 2B. As noted above, the flowchart illustrates the architecture, functionality, and operation of possible implementations of systems, methods, and computer program products according to various embodiments of the present invention.

As shown in FIG. 4, at step 410, a policy notification is pushed to a user device 210 via a primary communications channel. For example, the policy server 215 may receive a policy update from an administrator. The policy update may identify a user device 210 and/or a group of user devices 210 (e.g., based on device type, user information, etc.) for which to provide a policy update. In embodiments, the policy notification may include an indication that an updated policy is available on the policy server 215. As described herein, the policy server 215 may provide the policy notification via messaging server 220, and the messaging server 220 may provide an indication as to whether the user device 210 received the policy notification.

If, at step 420, a message delivery confirmation is received, at step 430, a policy request is received from the user device 210 by the policy server 215. For example, the user device 210 may receive the policy notification, and accordingly, may request the policy from the policy server 215. At step 440, the policy is pushed to the user device 210 and the user device 210 may implement the policy. In embodiments, the policy server 215 may identify the policy to push to the user device 210 based on an identifier of the user device 210 and/or based on information identifying a user of user device 210.

If, on the other hand, at step 420, a message delivery confirmation is not received, at step 450, an alternate policy notification is provided to the user device 210 via an alternate communications channel. For example, the policy server 215 may provide an alternate policy notification (e.g., a non-IP based notification, such as a "missed call" notification, an SMS message, or the like). The process may continue to steps 430 and 440, as described above. For example, in a scenario in which the alternate policy notification includes a missed call notification, the user device 210 may determine that an updated policy is available on the policy server 215 based on a telephone number associated with the missed call notification.

As described herein, one or more process steps of FIG. 4 may be omitted. For example, steps 410 and 420 may be omitted, and policy notifications may be provided to the user device 210 via alternate communications channels without involving the messaging server 220. Further, steps 430 and 440 may be omitted if the policy notification includes the policy itself, in which case the user device 210 would not need to request the policy from the policy server 215. In embodiments, a test message may be provided to the user device 210 via the primary communications to determine whether the user device 210 is able to communicate via the primary communications channel. If the messaging server 220 returns a delivery confirmation regarding the test message, the policy server 215 may push the policy notification to the user device via the primary communications channel. If, on the other hand, the messaging server 220 returns a delivery failure indication regarding the test message, the policy server 215 may provide the alternate policy notification to the user device via the alternate communications channel.

Figure 5:
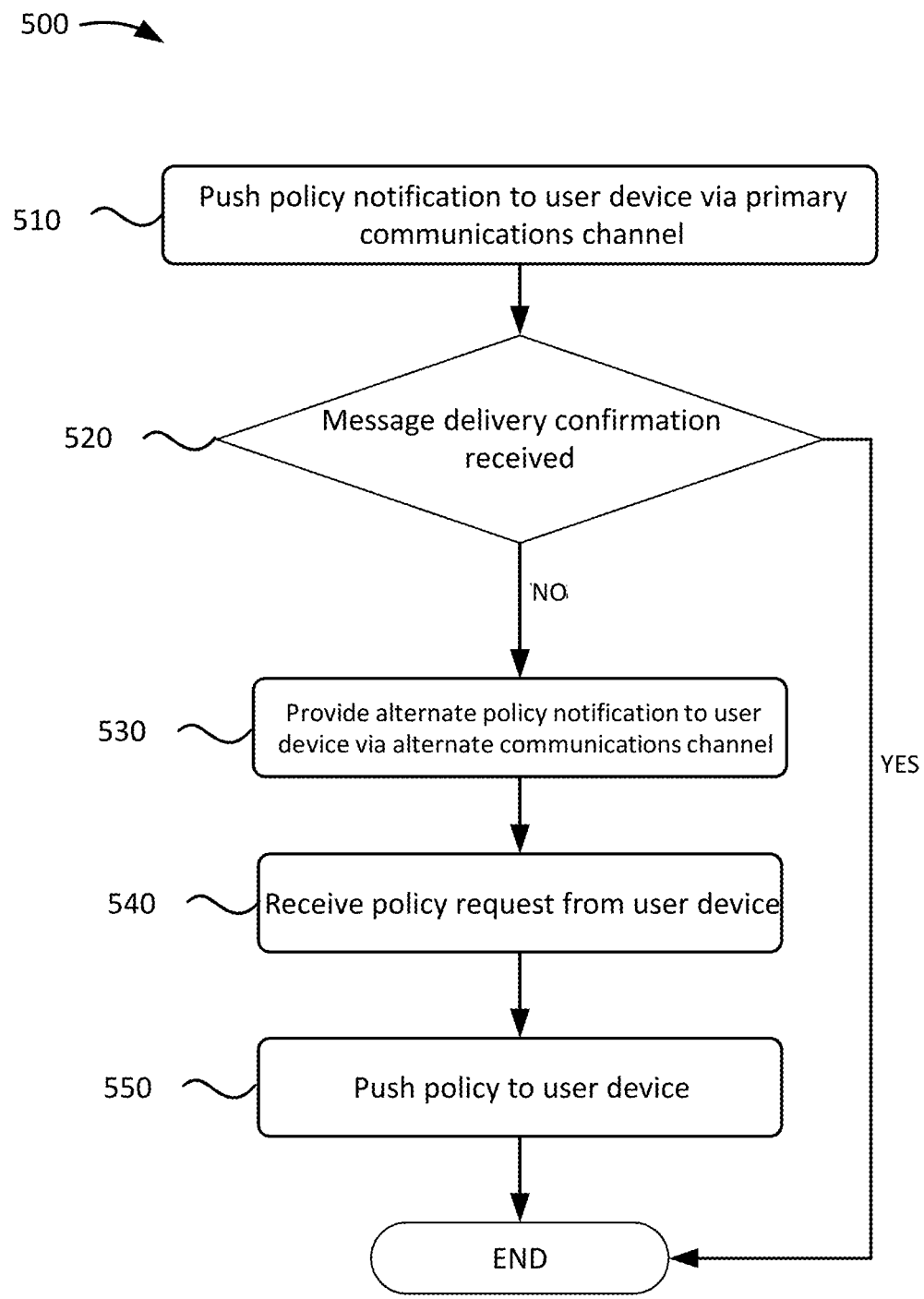
FIG. 5 shows an example flowchart for dynamically implementing updated policies via policy notifications in accordance with aspects of the present disclosure.

FIG. 5 shows an example flowchart for dynamically implementing updated policies via policy notifications in accordance with aspects of the present disclosure. The steps of FIG. 5 may be implemented in the environment of FIGS. 1, 2A, and/or 2B, for example, and are described using reference numbers of elements depicted in FIGS. 1, 2A, and/or 2B. As noted above, the flowchart illustrates the architecture, functionality, and operation of possible implementations of systems, methods, and computer program products according to various embodiments of the present invention.

As shown in FIG. 5, at step 510, a policy notification is pushed to a user device 210 via a primary communications channel. For example, the policy server 215 may receive a policy update from an administrator. The policy update may identify a user device 210 and/or a group of user devices 210 (e.g., based on device type, user information, etc.) for which to provide a policy update. In the example of FIG. 5, the policy notification includes information regarding the policy itself, e.g., information that the user device 210 may use to implement the policy without needing to request the updated policy from the policy server 215. As described herein, the policy server 215 may provide the policy notification via the messaging server 220, and the messaging server 220 may provide an indication as to whether the user device 210 received the policy notification.

If, at step 520, a message delivery confirmation is received, the process of FIG. 5 may end, as the policy server 215 will not need to take additional steps to effectuate a policy update. This is due to the fact that the user device 210 has received the policy notification and since the policy notification included information for user device 210 to update the policy itself without further involvement of policy server 215. If, on the other hand, at step 520, a message delivery confirmation is not received, at step 530, an alternate policy notification is provided to the user device 210 via an alternate communications channel. For example, the policy server 215 may provide an alternate policy notification (e.g., a non-IP based notification, such as a "missed call" notification, an SMS message, or the like). The alternate policy notification may include an indication that an updated policy is available on the policy server 215. Based on the user device 210 receiving the alternate policy notification, the policy server 215, at step 540, receives a request for the policy, and accordingly, at step 550, pushes the updated policy to the user device.

As described herein, one or more process steps of FIG. 5 may be omitted. For example, steps 510 and 520 may be omitted, and policy notifications may be provided to the user device 210 via alternate communications channels without involving the messaging server 220. Further, steps 530 and 540 may be omitted if the alternate policy notification includes the policy itself, in which case the user device 210 would not need to request the policy from the policy server 215.

Figure 6:
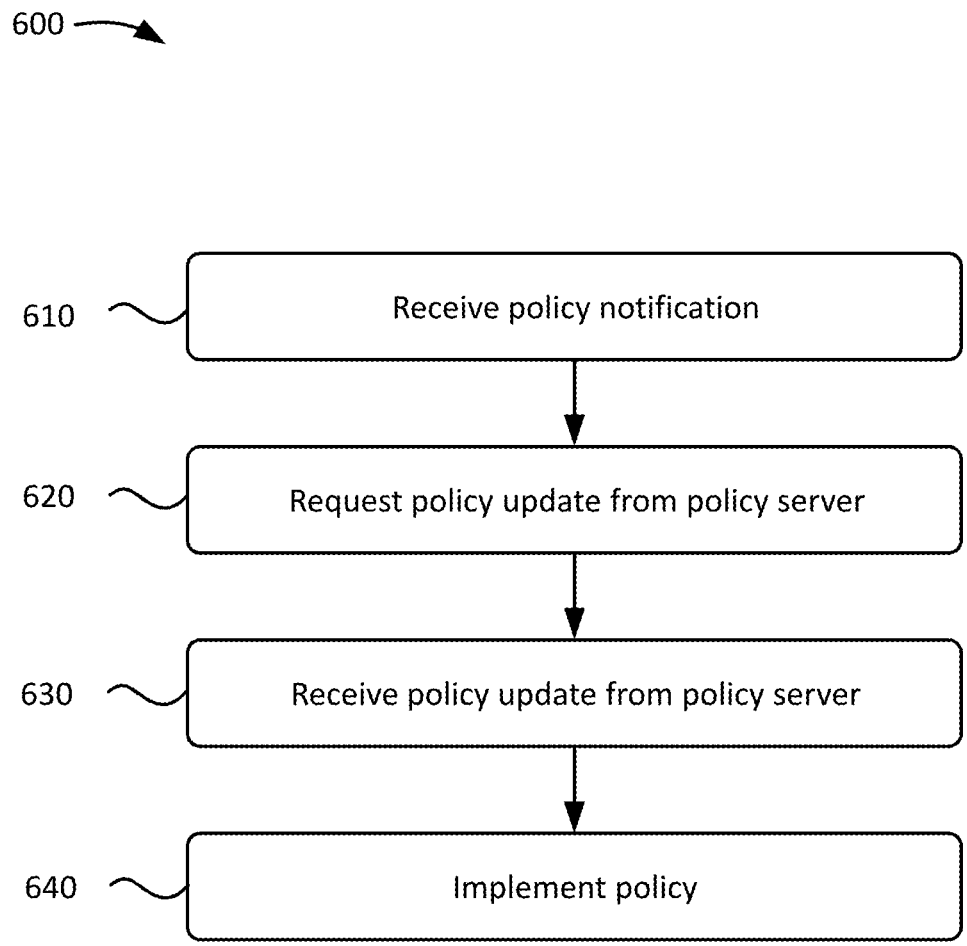
FIG. 6 shows an example flowchart for dynamically obtaining and implementing updated policies via policy notifications in accordance with aspects of the present disclosure.

FIG. 6 shows an example flowchart for dynamically obtaining and implementing updated policies via policy notifications in accordance with aspects of the present disclosure. The steps of FIG. 6 may be implemented in the environment of FIGS. 1, 2A, and/or 2B, for example, and are described using reference numbers of elements depicted in FIGS. 1, 2A, and/or 2B. As noted above, the flowchart illustrates the architecture, functionality, and operation of possible implementations of systems, methods, and computer program products according to various embodiments of the present invention.

At step 610, a policy notification is received. For example, the user device 210 may receive a policy notification (or an alternate policy notification) from the policy server 215. In embodiments, the policy notification may include an indication that an update policy is available on the policy server 215. For example, the policy notification may include text and/or other information that informs the user device 210 that a policy update is available on the policy server 215. As described herein, an application wrapper of the user device 210 may intercept the policy notification. In embodiments, the policy notification may be intercepted by the application wrapper to prevent the policy notification from being displayed on the user device 210.

At step 620, a policy update is requested from the policy server 215. For example, the application wrapper of user device 210 may request the updated policy from the policy server 215 based on intercepting the policy notification. As an example, if the policy notification includes a missed call notification, the application wrapper of the user device 210 may detect that the telephone number of the missed call notification matches a telephone number associated with an instruction to request the policy update. As another example, if the policy notification includes text, the application wrapper of the user device 210 may detect that the text is associated with an instruction to request the policy update. Accordingly, at step 630, an updated policy is received from the policy server 215 based on the user device 210 requesting the policy update. For example, the application wrapper of the user device 210 may receive the updated policy.

At step 640, the policy is implemented or applied (e.g., by the application wrapper of the user device 210). In embodiments, the user device 210 (e.g., the application wrapper) may resolve the user's state once a new policy has been applied. Resolving the user state may include moving a user back to permitted content within an application (e.g., similar to using a back button in a browser) until the user is in a permitted location within the application. Resolving the user state may also include restarting the application to ensure that the user is not in violation of the updated policy (e.g., by restoring the user's state to a home screen of the application or a screen having known permitted content). In embodiments, the user device may detect if the user is in a non-permitted section of the application and may apply the user's role in accordance with an updated policy.

Figure 7:
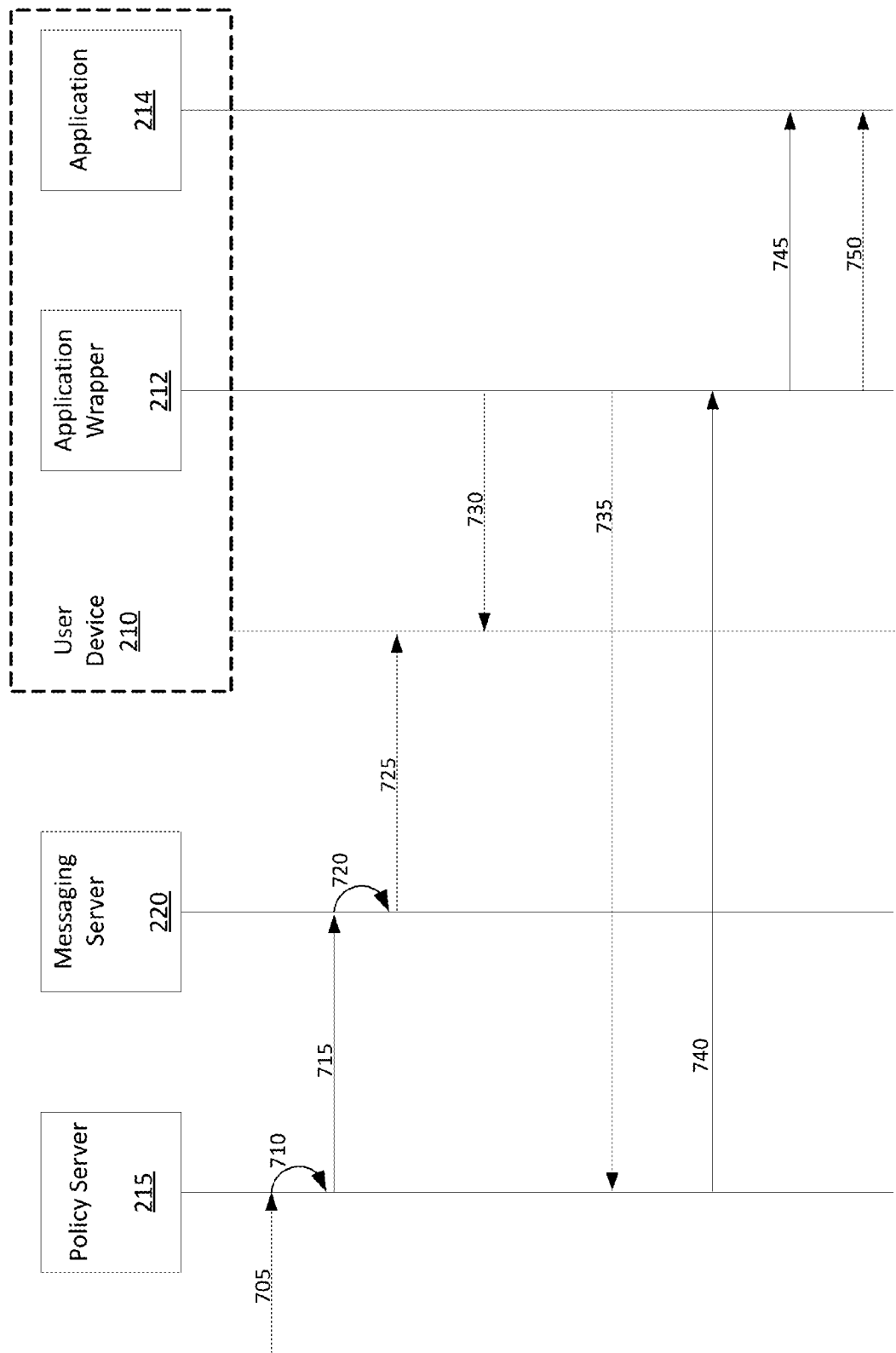
FIG. 7 shows an example swim-lane diagram for dynamically obtaining and implementing updated policies via policy notifications in accordance with aspects of the present disclosure.

FIG. 7 shows an example swim-lane diagram for dynamically obtaining and implementing updated policies via policy notifications in accordance with aspects of the present disclosure. The steps of FIG. 7 may be implemented in the environment of FIGS. 1, 2A, and/or 2B, for example, and are described using reference numbers of elements depicted in FIGS. 1, 2A, and/or 2B. As noted above, the diagram illustrates the architecture, functionality, and operation of possible implementations of systems, methods, and computer program products according to various embodiments of the present invention.

The example of FIG. 7 includes the following components: the policy server 215, the messaging server 220, and the user device 210. The user device 210 includes an application wrapper 212 and an application 214. At step 705, the policy server 215 may receive a policy update (e.g., from an administrator). The policy update may identify one or more user devices 210 for which the updated policy is targeted and should be applied. For example, the policy update may include individual and/or group identifiers of the user devices 210.

At step 710, the policy server 215 may identify a particular user device 210 for which the policy updated is targeted (e.g., based on the identifier and/or group identifier of the user device 210). At step 715, the policy server 215 may output a policy notification to the targeted user device 210 via a primary communications channel (e.g., via the messaging server 220). At step 720, the messaging server 220 may identify a messaging network via which to provide the policy notification (e.g., based on a messaging application of the user device 210, as is understood by those of ordinary skill in the art). Accordingly, the messaging server 220, at step 725, may provide the policy notification to the user device 210 (e.g., via a primary communications channel).

At step 730, an application wrapper 212 of the user device 210 may intercept the policy notification (e.g., to prevent the policy notification from being displayed on the user device 210). At step 735, the application wrapper 212 may request the policy from the policy server 215, and accordingly, at step 740, the policy server 215 may provide the policy to the application wrapper 212. At step 745, the application wrapper 212 may apply the policy to the application 214 of the user device 210 associated with the policy. At step 750, the application wrapper 212 may resolve the user's state within the application, as described herein.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A computer-implemented method, comprising:
providing, by a policy server comprised of a computing device, a policy notification to selected one or more user devices via a primary communications channel to cause the selected one or more user devices to update a policy, comprised of a security policy to control or block functions of the selected one or more user devices, which security policy has been previously established between the policy server and the selected one or more user devices, when the policy notification is received by the user device; and
providing, by the computing device, an alternate policy notification to the selected one or more user devices via an alternate communications channel when the selected one or more user devices does not receive the policy notification via the primary communications channel, wherein providing the alternate policy notification causes the selected one or more user devices to update the policy,
wherein the alternate policy notification includes a missed call notification, and wherein causing the one or more user devices to update the policy is based on detecting that a telephone number associated with the missed call notification matches a telephone number associated with an instruction to request the updated policy.

2. The method of claim 1, wherein the primary communications channel includes an external internet protocol (IP) network.

3. The method of claim 1, wherein the secondary communications channel includes a non-internet protocol (non-IP) network.

4. The method of claim 1, wherein the policy notification includes an internet protocol (IP) based notification or message including at least one of:
a text message;
a push notification; and
a computer file.

5. The method of claim 1, wherein the alternate policy notification includes a non-internet protocol (non-IP) based notification or message including
a short message service (SMS) message.

6. The method of claim 1, further comprising, receiving, from a messaging server, an indication that the policy notification was not received by the selected one or more user devices, wherein providing the alternate policy notification is based on receiving the indication that the policy notification was not received by the selected one or more user devices.

7. The method of claim 1, further comprising:
receiving a request for an updated policy from the selected one or more user devices based on providing the policy notification or the alternate policy notification; and
providing the updated policy to the selected one or more user devices.

8. The method of claim 1, wherein the policy notification or the updated policy notification includes information that allows the selected one or more user devices to update the policy without requesting an updated policy.

9. The method of claim 8, further comprising determining which of the selected on or more of the user devices are to receive a policy notification and update based on user information; and
pushing the policy notification and update to each of the determined user devices for implementation.

10. A computer program product comprising a computer readable medium having program instructions embodied therewith, wherein the computer readable medium is not a transitory signal per se, and the program instructions are readable by a server device to cause the server device to perform a method comprising:
receiving an update to a policy for a user device, wherein the policy comprises a security policy to control or block functions of the user device, which security policy has been previously established between the policy server and the user device;
providing, by the server device, a policy notification to the user device via a primary communications channel to cause the user device to update the policy when the policy notification is received by the user device;

determining that the user device is unable to communicate via the primary communications channel; and providing an alternate policy notification to the user device via an alternate communications channel based on the determining, wherein providing the alternate policy notification causes the user device to update the policy, wherein the alternate policy notification includes a missed call notification, and wherein causing the user device to update the policy is based on detecting that a telephone number associated with the missed call notification matches a telephone number associated with an instruction for the user to request the updated policy.

11. The method of claim 10, wherein determining that the user device is unable to communicate via the primary communications channel is based on a prior policy preventing the user device from communicating via the primary communications channel.

12. The method of claim 10, wherein determining that the user device is unable to communicate via the primary communications channel comprises:

sending a test message via the primary communications channel; and receiving, from a messaging server, an indication that the user device did not receive the test message.

13. The method of claim 10, wherein the primary communications channel includes an external internet protocol (IP) network.

14. The method of claim 10, wherein the secondary communications channel includes a non-internet protocol (non-IP) network.

15. The method of claim 10, wherein the alternate policy notification includes a non-internet protocol (non-IP) based notification or message including a short message service (SMS) message.

16. A system comprising:

a central processing unit (CPU), a computer readable memory and a computer readable medium;

program instructions to receive a policy notification from a policy server;

program instructions to request an updated policy from the policy server based on receiving the policy notification;

program instructions to receive the updated policy from the policy server; and program instructions to implement the updated policy;

wherein the program instructions are stored on the computer readable medium for execution by the CPU via the computer readable memory, and wherein the policy notification includes a missed call notification, wherein requesting the updated policy is based on detecting that a telephone number associated with the missed call notification matches a telephone number associated with an instruction to request the updated policy.

17. The system of claim 16, further comprising:

program instructions to intercept the policy notification to prevent the security policy from being displayed to a user.

18. The system of claim 16, wherein the policy notification includes text, wherein requesting the updated security policy is based on detecting that the text is associated with an instruction to request the updated security policy.

19. The system of claim 16, wherein the policy notification is received via a primary communications channel or an alternate communications channel.

* * * * *